US006223849B1

(12) United States Patent
Gödel et al.

(10) Patent No.: US 6,223,849 B1
(45) Date of Patent: May 1, 2001

(54) DEVICE FOR MOUNTING A COMPONENT

(75) Inventors: Frank Uwe Gödel, Stutensee; Georg Salzer, Waghäusel, both of (DE)

(73) Assignee: IWK Regler und Kompensatoren GmbH, Stutensee (DE)

( * ) Notice: Subject to any disclaimer, the term of this patent is extended or adjusted under 35 U.S.C. 154(b) by 0 days.

(21) Appl. No.: 09/160,250

(22) Filed: Sep. 25, 1998

(30) Foreign Application Priority Data

Oct. 3, 1997 (DE) ........................................... 297 17 678 U

(51) Int. Cl.[7] ............... B60K 13/04; F16L 3/01; E21F 17/02
(52) U.S. Cl. ............................................... 180/296; 248/60
(58) Field of Search .................. 180/296, 89.2; 248/58, 59, 60

(56) References Cited

U.S. PATENT DOCUMENTS 2,687,270  8/1954  Robinson .
4,659,117 * 4/1987  Holzhausen et al. ................... 285/49
4,875,716 * 10/1989  Winzen et al. .................... 285/124.4

FOREIGN PATENT DOCUMENTS

| 28 38 990 | 3/1980 | (DE) . |
| 33 21 382 | 2/1984 | (DE) . |
| 41 13 521 | 11/1991 | (DE) . |
| 195 30 011 | 2/1997 | (DE) . |
| 4-25 27 32 | 9/1992 | (JP) . |

* cited by examiner

Primary Examiner—Paul N. Dickson
(74) Attorney, Agent, or Firm—Paul Vincent

(57) ABSTRACT

In a device for the bearing of a component of a motor vehicle such as an exhaust gas assembly on the chassis of the motor vehicle, connecting components are provided for mounting respectively to at least the chassis of the motor vehicle and to the component which can move relative to each other, and which engage at least one damped resilient wire element.

13 Claims, 1 Drawing Sheet

DEVICE FOR MOUNTING A COMPONENT

This application claims Paris Convention priority of German Utility model application number 297 17 678.1 filed Oct. 3, 1997 the complete disclosure of which is hereby incorporated by reference.

BACKGROUND OF THE INVENTION

The invention concerns a device for mounting a component of a motor vehicle, such as an exhaust pipe assembly, to a chassis of the motor vehicle.

The elastic suspension of the exhaust gas assembly of motor vehicles has, in addition to support of the actual weight of the assembly, the principal goal of compensating for motion of the exhaust gas assembly relative to the chassis caused by load changing motion of the drive chain as well as to accept forces from the exhaust assembly due to acceleration and braking. In addition, vibrations transferred from the drive chain and the motor and the resulting possible resonances in the exhaust configuration should be isolated from the chassis.

Towards this end, suspension mechanisms made from a rubber elastic material are generally utilized as known in the art through DE-PS 43 12 504, DE-PS 44 17 651 and EP-A-0 529 250.

The suspension mechanism known in the art through DE-PS 43 12 504 has, e.g. an attachment component, a U-shaped supporting component as well as a bearing component connected to the exhaust assembly which is inwardly disposed and to which two upper and lower braces comprising rubber elastic material are mounted. Same are located at the oppositely positioned end sections on the support member or on the attachment member. In the holding device known in the art from DE-PS 44 17 651, a V-shaped suspension element is provided made from rubber elastic material which is connected to the support structure of the motor vehicle and to the exhaust gas assembly via three connecting openings. The suspension known in the art from EP-A-0 529 250 is a rhombus-shaped loop capable of accepting tensile forces and having braces shaped thereon made from an elastic material as well as upper and lower holding openings for accepting holding brackets on the motor vehicle and on the exhaust gas assembly.

All three of these suspensions have the common feature that they attempt, by means of complicated configuration of the rubber suspension, to achieve different properties with respect to stiffness, and mobility of the suspension device in each of the various differing directions. In particular, use of rubber material is thereby disadvantageous, since this material has thermal limits. The configuration of the elastic suspension on the exhaust assembly, which becomes quite hot during operation, must therefore be taken into consideration. The softness which is required for ease of use, i.e. low stiffness for the suspension device and needed to achieve good vibration isolation has, in addition, the consequence that undesirable large resilient paths occur in the elastic elements in response to larger force loads caused by initial acceleration or by driving and braking processes unless corrective measures are taken to limit the path. Such measures are often quite complicated.

It is therefore the underlying purpose of the invention to create a device for mounting of the above mentioned kind which is distinguished by high thermal shape stability as well as different characteristics with respect to stiffness and mobility in differing directions.

SUMMARY OF THE INVENTION

This purpose is achieved in accordance with the invention with an apparatus of the above mentioned kind which is characterized by at least two connecting components connected respectively to the chassis of the motor vehicle and to the assembly, which are movable relative to each other, and which engage at least one damped resilient wire element.

In accordance with the invention, rubber elastic suspension elements are no longer used, rather connection components and wire elements connecting these.

In a preferred embodiment, the connection components are formed by holding members engaging another to form housing-like pockets and which are movable relative to each other. Wire cushions made from pressed metal wire are disposed in the pockets. The wire elements are conventional highly effective wire cushions made from pressed metal wire such as pressed metal weave, wire mesh, wire screens, wire weave or the like which, under all conditions and following deflection out of its non-loaded shape in response to acting forces, return to their neutral position in a strongly damped nearly asymptotic fashion. In addition, the cushion material is completely thermally insensitive to the temperatures occurring at the exhaust assembly and, together with the compact construction of the holding members, allows the suspension formed thereby to be disposed at that location at which it is most effective with regard to vibration considerations. It is therefore also possible to introduce same at the center of gravity of the muffler and on curved pipe regions to which a mounting of a rubber suspension would not be possible for reasons of lack of space and/or temperatures.

The wire cushion is preferentially loadable with respect to tensile and compression forces and with respect to flexural and sheer forces. The use of a metal wire cushion in accordance with the invention and its suitable configuration facilitates differing stiffnesses in differing motional directions, wherein a soft characteristic dependence is preferentially observed in the direction of the vertical axis of the motor vehicle to achieve as best an isolation as possible. It is thereby possible to effect a minimum stiffness for the suspension in a neutral position of the exhaust gas assembly which facilitates as good a vibrational isolation between the exhaust gas assembly and the chassis of the motor vehicle as possible, since use of the metal wire cushion in accordance with the invention with its substantially progressive characteristic curve effects a suspension with limited deflection.

It is particularly preferred when the holding members are mounted to the chassis and exhaust gas assembly respectively. In this manner, a "fixed bearing" is created for the exhaust gas assembly so that attachment to relatively soft exhaust gas pipes of the exhaust gas assembly made from flexible components is also possible. This "fixed bearing"accepts the acceleration and deacceleration forces of the exhaust gas assembly along the longitudinal axis of the motor vehicle under small displacements as a result of which the exhaust gas pipe advantageously remains in its initial state. This also pertains to thermal length changes of the exhaust gas assembly.

A preferred configuration provides that the housing-like pockets which serve as abutments for the wire cushion are formed by a pot-shaped housing for accepting at least one wire cushion and a plunger penetrating in a freely moving fashion into the housing via an opening in the bottom region and penetrating at least partially through the wire cushion or cushions in a substantially central fashion and upon which the wire cushion or cushions can seat, at least in part. A suspension device of this kind has a configuration facilitating a compression loaded metal cushion to also effect a low stiffness along the vertical axis of the motor vehicle. The plunger preferentially has a head serving as an abutment for the metal cushion or cushions which extends radially in an outward direction from the plunger. The freely moving plunger transfers the motion of the pipe components or hoses of the exhaust gas assembly onto the metal wire cushion. Abutment is thereby effected not only by the head of the plunger but also by the walls of the pot-shaped housing. If the cushions seat freely, they are compressed. In the event that the wire cushions are fixed to the holding member components, e.g. to the head of the plunger, by means of weldment, gluing or the like, they are then subjected to tensile forces. In order to achieve as stable a bearing as possible, the housing is mounted to the chassis at least via a peripheral edge and the plunger is mounted to the exhaust gas assembly. The mobility of the plunger facilitates an advantageous maintenance of the installed state of the hose or pipe of the exhaust gas configuration even in the event of thermal changes in length.

Another preferred embodiment provides that the housing-like pockets serving as abutment for the wire cushion are formed by at least an outer housing portion as well as by at least two inward peripheral ring components having a separation relative to the outer housing component which at least partially surround and engage the wire cushion or cushions. In order for the wire cushion to thereby be loaded with respect to sheer forces, the inner ring portions extend parallel to each other and penetrate through a lower opening in the outer housing component and, in particular, the inner ring components engage substantially half of the wire cushion or cushions while forming a gap with respect to the outer housing component. In this case as well, the wire cushions can seat freely on the ring components as well as on the housing components or be mounted rigidly thereto.

A device for the elastic mounting of an exhaust gas assembly is thereby created which, due to the configuration and design of both the wire cushion as well as the holding members, constitutes a suspension whose properties can be changed over wide ranges in differing directions.

Further advantages and features of the invention can be derived from the claims as well as from the following description in which two non-exhaustive, exemplary embodiments are described with reference to the drawing.

DESCRIPTION OF THE PREFERRED EMBODIMENT

Figure 1:
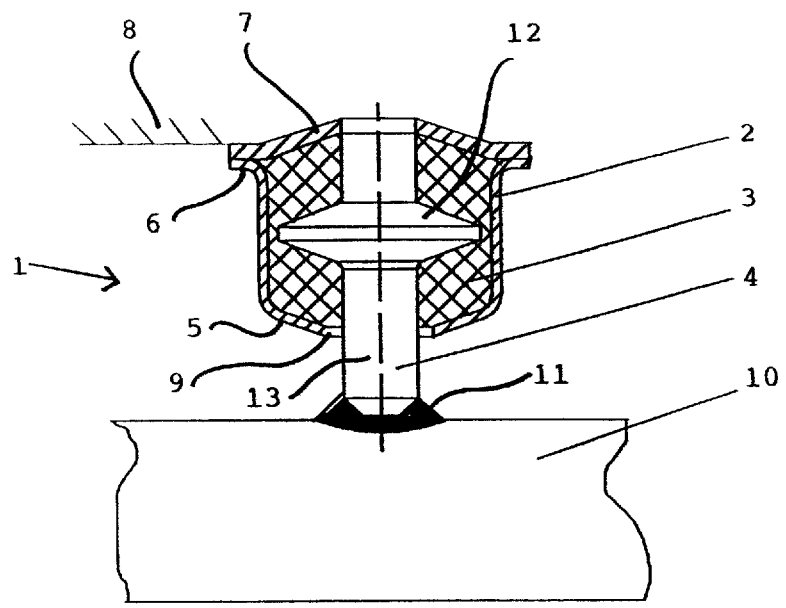
FIG. 1 shows a longitudinal cut through a first embodiment of the suspension device in accordance with the invention.

In the first embodiment shown in FIG. 1, the suspension device or joint unit 1 in accordance with the invention has a first connecting component comprising an outer holding member in the form of a pot-shaped housing 2 for acceptance of one of more wire cushions 3 as well as a plunger 4 serving as a second connecting component and also functioning as a holding member. The holding member 2 has a plate-shaped floor 5 having slanting side surfaces as well as an outer peripheral edge 6 at its end opposite the floor 5. The upper side of the housing 2 is closed by a lid 7 slanted in a complementary fashion with respect to the floor 5. The housing 2 is fixed to the lower side of the chassis 8 of a motor vehicle via the peripheral edge 6 as well as the lid 7.

The floor 5 has a central opening or a break-through 9 through which the plunger 4, attached at one end 11 to an exhaust gas pipe 10 of the exhaust gas assembly, freely moves.

The plunger 4 has a head 12 which is approximately centered in the housing 2 in a neutral position, which serves as an abutment for the wire cushion 3, and which extends radially in an outward direction from the plunger 4. The head 12 of the plunger 4 is substantially configured as a double truncated cone, wherein the conical surfaces projecting beyond the plunger shaft 13 and facing the floor 5 are parallel to the slanted surfaces of the floor 5 and the conical surfaces facing away from the floor 5 are parallel to the lid 7 in a mirror symmetric manner with respect to a radial plane. In order for the plunger 4 to be able to optimally move within the housing 2 for accepting the back and forth motion of the exhaust gas pipe 10, the inner diameter of the break-through 9 in the floor 5 of the housing 2 is larger than the outer diameter of the plunger shaft 13.

The wire cushion 3 can seat freely on the head 12 or can be fixed thereto for facilitating not only compression but also tensile loading.

Figure 2:
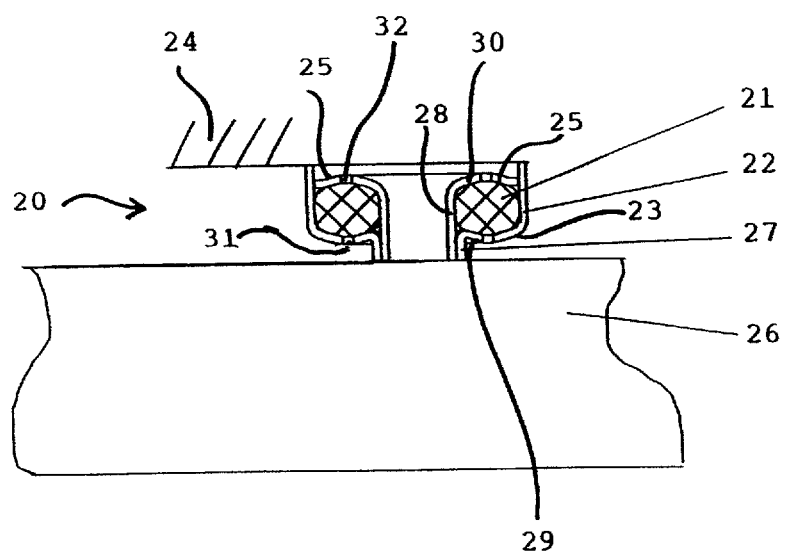
FIG. 2 shows a longitudinal cut through a second embodiment of the suspension device in accordance with the invention.

In the second embodiment shown in FIG. 2, the suspension device or joint unit 20 in accordance with the invention has a ring shaped peripheral wire cushion 21 which is engaged at least partially at its radially outer side by an outer housing component 22 serving as a connection or holding member. This housing portion 22 is also configured as a substantially pot-shaped object and has a plate-shaped floor 23. The outer housing component 22 is attached to the chassis 24 of a motor vehicle at its upper side opposite the floor 23. A ring shaped peripheral shoulder 25 is formed on the inner side of the housing component 22 and engages approximately half of the wire cushion 21 at its upper side (relative to the floor 23). A substantially U-shaped receptacle for the wire cushion 21 is thereby effected. In addition, ring members 27, 28, fixed to the exhaust pipe 26 of the exhaust gas assembly 26, are provided as connecting or holding members and extend parallel and adjacent to each other up to the floor 23 of the housing component 22. The two ring members 27, 28 widen radially in a substantially funnel-like fashion at their ends facing away from the exhaust gas pipe 26, wherein the inwardly disposed ring portion 28 is longer than the outward ring member 27 and thereby widens at a later position. A substantially U-shaped receptacle for the wire cushion 21 is thereby formed, halves of which are substantially surrounded by the two ring members 27, 28. The funnel-shaped ends 29, 30 of the ring members are thereby separated from the floor 23 and the shoulder 25 via gaps 31, 32. In this fashion, the wire cushion 21 is subjected to sheer forces during deflection.

These wire cushions 3 and 21 in the embodiments shown can be made from a single piece or be mutually adjacent segments.

Clearly, the invention is not limited to the embodiments shown and there are a plurality of possible shapes and configurations for the connecting components and wire cushions within the framework of the present claims.

We claim:

1. A device for suspending a substantially rigid tail pipe from a chassis in a motor vehicle, the device comprising:
    a damping resilient wire member;
    a first connecting member for mounting to the chassis, said first connecting member engaging said wire member;
    a second connecting member for mounting to the substantially rigid tail pipe, said second connecting member engaging said wire member and cooperating with said first connecting member for movement relative thereto;

means for mounting said first connecting member to the chassis; and means for mounting said second connecting member to the substantially rigid tail pipe.

2. The device of claim 1, wherein said first and said second connecting members are holding members which pass through another for mutual relative motion to form a pocket, wherein said wire member comprises a wire cushion made from pressed metal wire and disposed in said pocket.

3. The device of claim 2, wherein said wire cushion is subjected to at least one of tensile and compression loads.

4. The device of claim 2, wherein said wire cushion is transversely loaded.

5. The device of claim 1, wherein said wire member is loaded by shear forces.

6. The device of claim 1, wherein said wire member has a soft characteristic dependence in a direction of a vertical axis of the motor vehicle.

7. The device of claim 2, wherein said pocket consists essentially of a pot-shaped housing for accepting said wire member and a plunger movable relative to said pot-shaped housing and projecting through an opening in a floor region thereof, into said pot-shaped housing, and penetrating at least partially through said wire member in a substantially central fashion and on which said wire member at least partially seats.

8. The device of claim 7, wherein said plunger comprises a head serving as an abutment for said wire member and extending in an outward direction radially from a plunger shaft.

9. The device of claim 7, wherein said pot-shaped housing is attachable to the chassis via a peripheral edge and said plunger is fixable to said substantially rigid tail pipe.

10. The device of claim 2, wherein said housing-like pocket comprises an outer housing member and at least an inner and an outer ring member. said inner and outer ring members inwardly disposed in a peripheral fashion and separated from said outer housing member by annular gaps to at least partially surround and engage said wire member.

11. The device of claim 10, wherein said inner and outer ring members extend parallel with respect to each other said ring members penetrating through a lower opening in said outer housing member defined by one of said annular gaps.

12. The device of claim 10, wherein said ring members engage substantially half of said wire member.

13. The device of claim 10, wherein said ring members are fixable to said substantially rigid tail pipe and said outer housing member is fixable to the chassis of the motor vehicle.

* * * * *